United States Patent [19]

Mintz et al.

[11] 4,391,925

[45] Jul. 5, 1983

[54] SHEAR THICKENING WELL CONTROL FLUID

[75] Inventors: Donald Mintz, Fort Lee, N.J.; Cyrus A. Irani, Monroeville, Pa.

[73] Assignee: Exxon Research & Engineering Co., Florham Park, N.J.

[21] Appl. No.: 391,812

[22] Filed: Jun. 24, 1982

Related U.S. Application Data

[63] Continuation of Ser. No. 79,437, Sep. 27, 1979, abandoned.

[51] Int. Cl.$^3$ .............. C08L 3/34; C08L 5/01; E21B 33/13
[52] U.S. Cl. .................... 523/130; 166/270; 166/273; 166/292; 166/293; 166/294; 166/295; 252/8.5 A; 252/8.5 B; 252/8.5 C; 252/8.5 LC; 523/334; 524/104; 524/446
[58] Field of Search ............. 166/270, 273, 292, 293, 166/294, 295; 252/8.5 A, 8.5 C, 8.5 LC 8.5 B; 523/130, 334; 524/446, 104

[56] References Cited

U.S. PATENT DOCUMENTS

| | | | |
|---|---|---|---|
| Re. 27,888 | 1/1974 | Li ........................... 208/308 |
| Re. 29,716 | 8/1978 | Clampitt et al. .......... 166/270 |
| 2,748,867 | 6/1956 | Lissaut ..................... 166/309 |
| 2,775,557 | 12/1956 | Morean ................... 523/130 |
| 2,836,555 | 5/1958 | Armentrout .............. 166/292 |
| 2,868,753 | 1/1959 | Morean ..................... 524/5 |
| 2,890,169 | 6/1959 | Proker ..................... 166/293 |
| 3,028,913 | 4/1962 | Armentrout .............. 166/292 |
| 3,070,543 | 12/1962 | Scott .................... 252/8.5 A |
| 3,081,260 | 3/1963 | Park .................... 252/8.5 C |
| 3,082,823 | 3/1963 | Hower ..................... 166/294 |
| 3,323,603 | 6/1967 | Lummas ..................... 175/65 |
| 3,396,105 | 8/1968 | Durdyn et al. ......... 252/8.5 P |
| 3,396,790 | 8/1968 | Eaton ...................... 166/270 |
| 3,407,878 | 10/1968 | Engle ...................... 106/294 |
| 3,420,299 | 1/1969 | Cloud ..................... 166/293 |
| 3,448,800 | 6/1969 | Parker et al. ............ 166/294 |
| 3,558,545 | 1/1971 | Lummus .................... 525/196 |
| 3,617,546 | 11/1971 | Li et al. ................. 210/638 |
| 3,676,363 | 7/1972 | Mosier .................... 252/316 |
| 3,696,028 | 10/1972 | Li et al. ................. 208/308 |
| 3,713,915 | 1/1973 | Fast ........................ 149/2 |
| 3,718,187 | 2/1973 | Milton .................... 166/295 |
| 3,719,590 | 3/1973 | Li et al. ................. 208/308 |
| 3,746,725 | 7/1973 | Eilers et al. ............ 524/377 |
| 3,779,907 | 12/1973 | Li et al. ................. 210/638 |
| 3,816,308 | 6/1974 | Blanc .................... 252/8.5 C |
| 3,838,047 | 9/1974 | Le Blanc ............... 252/8.5 A |
| 3,880,764 | 4/1975 | Denham ................. 252/8.5 A |
| 3,893,510 | 7/1975 | Elphingstone et al. ...... 166/294 |
| 3,943,083 | 3/1976 | Adams et al. ............ 523/130 |
| 3,949,560 | 4/1976 | Clem ....................... 405/264 |
| 3,958,638 | 5/1976 | Johnston ................. 166/295 |
| 3,976,580 | 8/1976 | Kaminstein et al. ....... 252/316 |
| 3,985,659 | 10/1976 | Feiretta ............... 252/8.5 C |
| 4,001,109 | 1/1977 | Li et al. ................. 210/638 |
| 4,036,301 | 7/1977 | Powers et al. ........... 166/293 |
| 4,040,967 | 8/1977 | Nimerick et al. .......... 524/42 |
| 4,042,031 | 8/1977 | Knapp .................... 166/276 |
| 4,056,462 | 11/1977 | Li et al. ................. 208/308 |
| 4,064,040 | 12/1977 | Singhal et al. .......... 210/638 |
| 4,086,163 | 4/1978 | Cahn et al. .............. 210/638 |
| 4,182,417 | 1/1980 | McDonald et al. ........ 166/295 |
| 4,190,110 | 2/1980 | Beirute .................. 166/391 |

FOREIGN PATENT DOCUMENTS

| | | |
|---|---|---|
| 1070235 | 1/1980 | Canada . |
| 1070236 | 1/1980 | Canada . |
| 2008171 | 5/1979 | United Kingdom . |
| 2018737 | 2/1980 | United Kingdom ......... 260/29.65 |
| 492646 | 12/1975 | U.S.S.R. ................. 166/294 |

OTHER PUBLICATIONS

Derwent Abst. (SU-629322) Perm. Petrol Ind. Res. 59298B/32 Sep. 6, 1978 "Plugging Soln.".
Derwent Abst 36479Y/21 (Dl-124430) (2-23-77) OR-KO/CC "Non-Disp. Polym. Contg Bentonite and Acrylamide Polym".

*Primary Examiner*—John C. Bleutge
*Assistant Examiner*—Herbert J. Lilling
*Attorney, Agent, or Firm*—Joseph J. Allocca; David H. Vickrey

[57] ABSTRACT

The instant invention is directed to shear thickening fluids which comprise a water swellable clay capable of rapidly forming a paste having a strength of at least 2000 lbs/100 ft$^2$ upon interaction with the aqueous phase employed and present in sufficient concentration to form such a paste, a nonaqueous phase comprising a hydrocarbon material and surfactant, and an aqueous phase comprising water and a water-soluble polymer, wherein the clay and the aqueous phase are kept separated by the intervening hydrocarbon-surfactant phase. The intervening oil phase prevents the interaction between the water-polymer phase and the clay and results in a stable, non-reacting, pumpable composite, until such time as the oil barrier is ruptured by deliberate application of a sufficiently high shear force. Upon such rupture, the materials interact resulting in a semi-rigid high strength paste.

28 Claims, 5 Drawing Figures

LOW SHEAR THICKENING TIMES AND PASTE STRENGTHS AFTER HIGH SHEAR OF API BENTONITE L.M. SHEAR THICKENING FLUID AS A FUNCTION OF $H_2O$/CLAY WEIGHT RATIO*

*FIXED SURFACTANT/CLAY (0.48), OIL/CLAY (1.0), AND POLYMER/CLAY (0.065) WEIGHT RATIOS; DATA TABULATED IN TABLE 1

LOW SHEAR THICKENING TIMES AND PASTE STRENGTHS AFTER HIGH SHEAR API BENTONITE L.M. SHEAR THICKENING FLUID AS A FUNCTION OF (OIL+SURF)/CLAY WEIGHT RATIO*

*(OIL+SURF) = 32.5% $A_2$ IN S100N; FIXED $H_2O$/CLAY (4.0) AND POLYMER/CLAY (0.041) WEIGHT RATIOS; DATA TABULATED IN TABLE 3
$A_2$ USED IN PARANOX 106

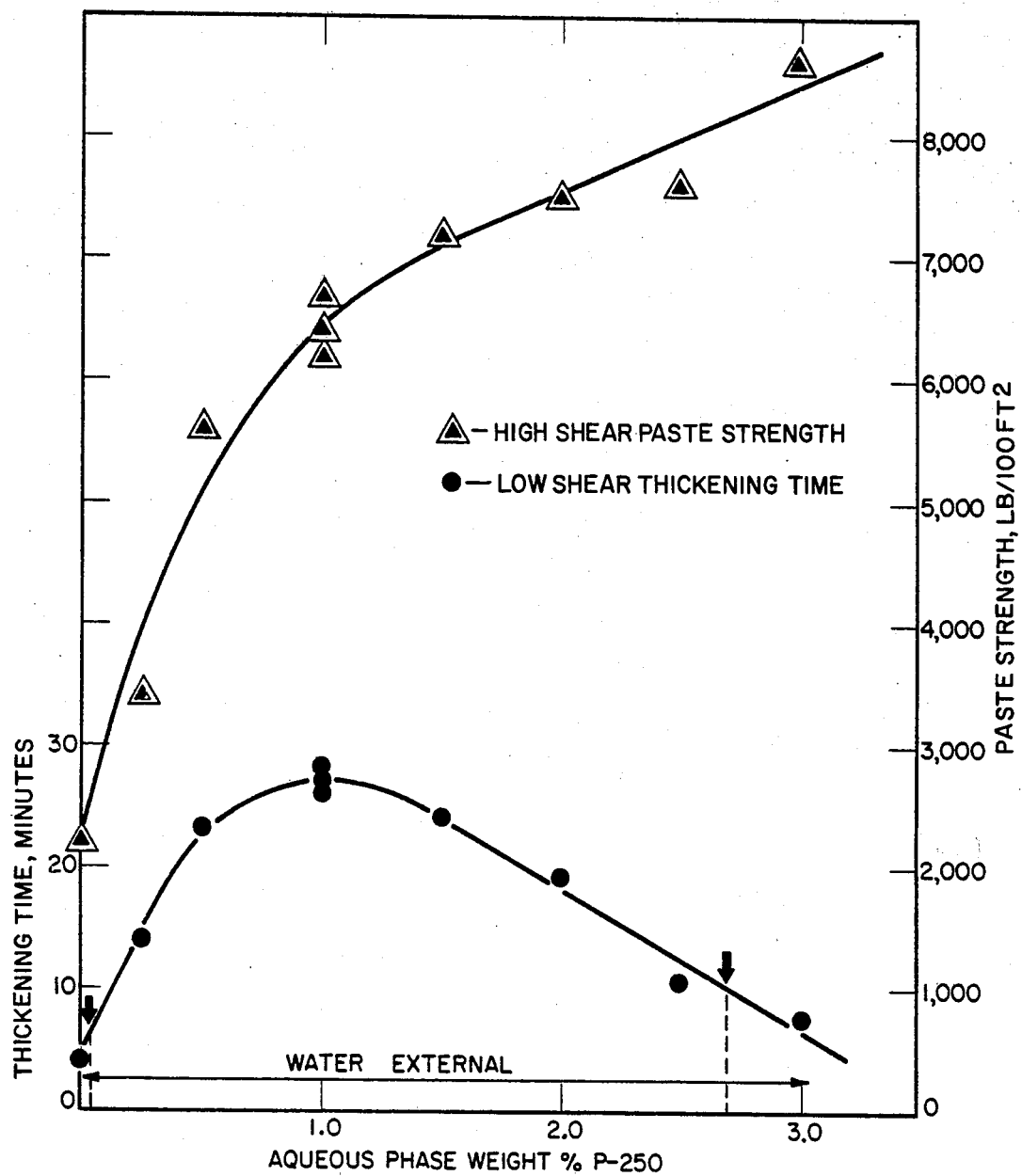

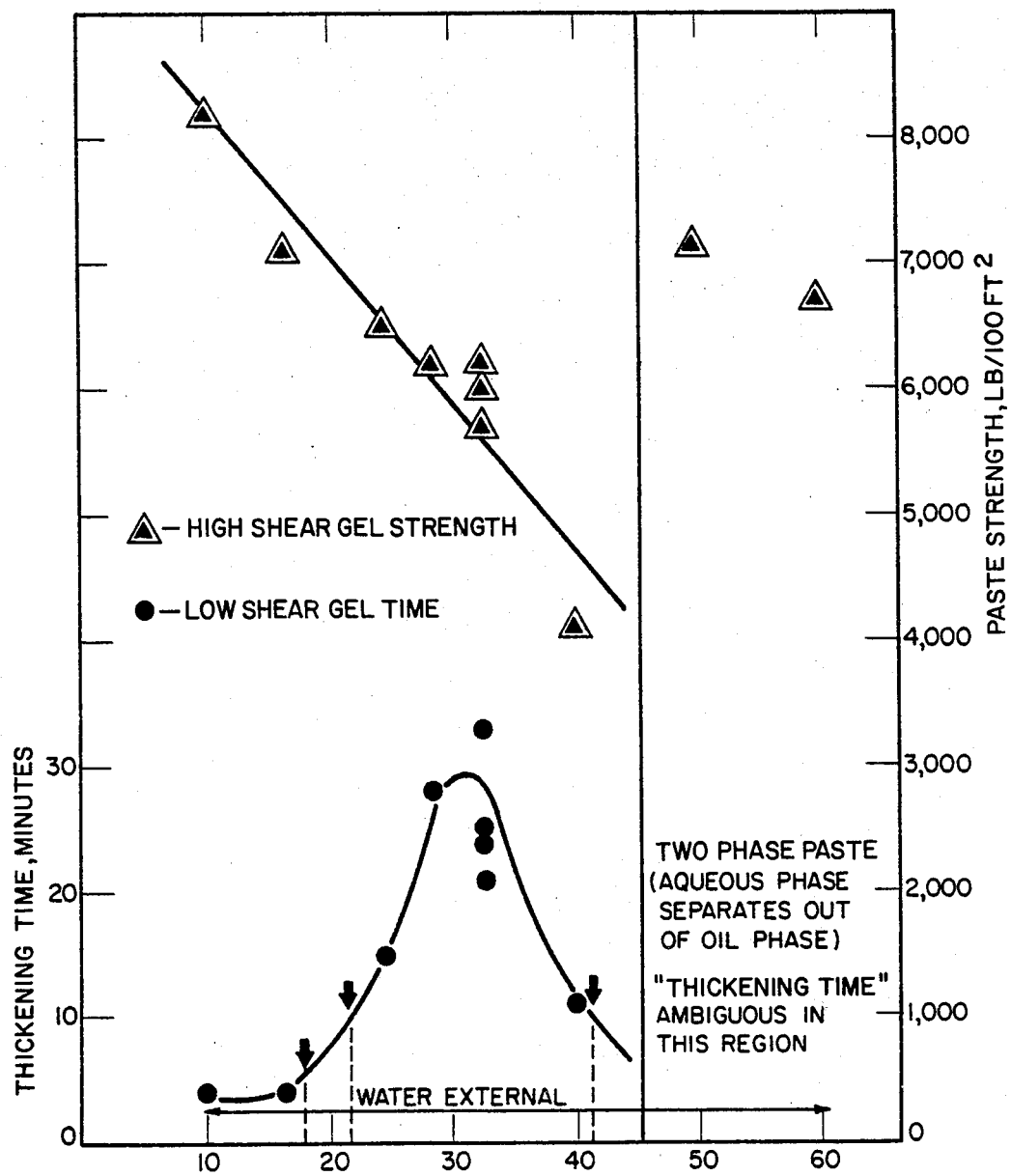

SHEAR THICKENING WELL CONTROL FLUID

This application is a continuation of application Ser. No. 079,437, filed Sept. 27, 1979, now abandoned.

BRIEF DESCRIPTION OF THE INVENTION

The instant invention is directed to shear thickening fluids useful for well control, particularly blowout control. The fluid composites comprise a water-swellable material phase (clay for short) capable of rapidly forming a paste having strength of at least 2000 lbs/100 ft$^2$ with the aqueous solution employed and present in sufficient quantity to form such a paste, which can preferably constitute any of the known hydratable clays such as bentonite and attapulgite, a nonaqueous hydrophobic phase (oil for short) which comprises a hydrocarbonaceous component and a surfactant-strengthening agent component, and an aqueous phase which comprises water and a water-swellable/water-soluble polymer, which when permitted to interact with the clay, results in a semi-rigid high strength paste (at least 2000 lbs/100 ft$^2$).

Preferably, the clay is encapsulated in the oil phase, and this encapsulated clay is suspended in the aqueous phase resulting in a composite which is identified as a clay in oil in aqueous phase material, or as an aqueous continuous phase system.

Alternatively, the aqueous phase can itself be encapsulated as discrete droplets in the oil phase whereby the oil phase becomes the continuous phase, the system being identified and described as a clay in oil, aqueous phase in oil system. Also, combination of the above examples commonly called "double emulsions" are possible.

Broadly, the clay and the aqueous phase are kept separate from each other by an intervening oil phase until such time as their interaction is desired. Such interaction is effected by rupturing the oil phase envelope by the application of a shear force sufficient to rip apart the oil phase envelope and thereby mix the clay/water-polymer components. Such a shear can be generated by passing the pumpable fluid through the orifices of a drill bit or other nozzle at the end of a drill pipe in a wellbore or by pumping the material through a pipe at a sufficiently high rate so that on exiting the pipe, the fluid experiences a pressure drop sufficient to tear the envelope.

In drilling or production operations, this fluid is pumped down the drill pipe only when necessary to a specific well-control problem, such as controlling a blowout or sealing off a zone of lost circulation or blocking some other unwanted flow path. This material is a well control-lost circulation fluid and should not be confused with typical well circulation-drilling fluids containing clay and water-polymer components.

The material of the instant invention is stable to the forces exerted upon it during pumping down the well pipe. However, passing through the nozzles of the drill bit or exiting a pipe at a high differential pressure applies a sufficient force to rupture the oil envelope and mix the clay and water-polymer components into a semi-rigid paste capable of plugging a well and sealing a blowout or sealing a circulation thief zone or other unwanted flow channel.

The stiff paste formed by this invention will have a shear strength of at least 2000 lbs/100 ft$^2$. The ability of this paste to resist flow in some particular flow channel will depend on well-known physical principles. In channels with circular cross-section, the pressure required to move a plug will be $$P = \tau L / 300 D$$

where

P is the differential pressure across the plug, in psi
$\tau$ is the shear strength of the paste, in lb/100 ft
L is the length of the plug, in ft
D is the diameter of the channel, in inches.

The stiff paste formed by the use of the instant composite can also stop pre-existing unwanted flows provided that the composite is injected into the unwanted flow at an appropriately high rate and provided that the unwanted flow is exiting through a flow channel long enough for a paste plug to be formed.

The exact placement of the composite resulting in a paste plug in or near a wellbore will depend on the problem to be treated. For example, if unwanted fluid was entering the wellbore at the bottom and flowing uphole, then the paste plug would be desired as close to the bottom of the hole as possible. On the other hand, if fluid was flowing downhole from and departing the wellbore undesireably into a thief formation, the composite would be pumped into the wellbore just above the thief zone so that the paste would form and enter the flow channels in that zone and plug them. Other possible uses of the present invention can also be envisioned, such as blocking channels in cement behind casing, repairing leaks in casing or tubing, placing temporary plug in various places, etc.

Because of the simplicity of the system and the use of materials which are typically "on hand" at drilling sites, well control problems can be handled much more quickly than in the past. Indeed, preventing measures can be employed at the first hint of trouble, even before the event has occurred or gotten completely out of control. By simply pumping the composite of the instant invention down the pipe and subjecting it to a shear at the desired location, a plug is introduced which is of sufficient strength to control the well.

BACKGROUND OF THE INVENTION

During drilling on production of an oil or gas well, there are occasionally unwanted flows of fluid in or near the wellbore; and there are also occasionally unwanted channels open downhole where unwanted flow could take place. Examples of these problems are:

Unwanted influx of formation fluid into the wellbore
Loss of drilling fluid into fractures or vugs in the formation
Channels in cement behind casing
Holes in casing
Improperly sealing liner hangers.

A typical scenario may be presented as follows:

When an unusually high pressure formation is encountered, it may be necessary to employ drilling mud at such high weight that a formation above the high pressure zone is fractured. This fractured zone then becomes a "lost zone" into which mud flows at such a high rate that "lost circulation" occurs. The lost circulation may be so severe that it ultimately becomes impossible to maintain a column of mud above the high pressure zone sufficient to impart the necessary hydrostatic head to offset the high pressures in the high pressure zone. As this occurs, the well becomes increasingly susceptible to blowout into the lost zone or to the surface.

There are a number of things which are tried when one or another of these problems are encountered. A common solution is to force a cement slurry into the unwanted flow channel. This procedure is often successful, although sometimes multiple treatments are necessary, as long as there is no significant flow present in the unwanted channel. Cement is useless against a pre-established flow because cement has almost no flow resistance until it is set. Thus it is always necessary to stop the flow before using cement to plug the flow channel.

The hydrostatic head of various fluids is often employed to prevent or stop unwanted movement of fluids up the wellbore. In particular, most blowouts involve the uncontrolled flow of formation fluids into the wellbore and then upwards in the wellbore. This type of blowout can be controlled by injecting fluid at the proper density and rate into the wellbore at or near the point of influx. In practice, the required density and rate may be difficult to obtain.

The unwanted loss of fluids from the wellbore is often treated by injecting a slurry of fibrous, lumpy, or flaky material into the wellbore at the region of the loss. These "lost circulation materials" are intended to plug or mat over the channels through which the fluid is entering the rock.

A pasty material known as "gunk" is sometimes used as a lost circulation material and occasionally to form temporary plugs in the wellbore. Gunk is a slurry of dry powdered bentonite in diesel oil. A typical gunk recipe is 350 lb of bentonite in one bbl of diesel oil. This slurry is quite fluid when mixed and remains fluid as long as it does not contact water. Mixing gunk slurry with an approximately equal volume of water causes the clay to hydrate giving a stiff paste. If formed at the right time and at the right place, this gunk paste is an effective lost circulation and plugging material. However, since the gunk slurry will hydrate and thicken immediately upon contacting water, it must be kept dry until it has been pumped downhole to the place where a plug is desired. The mixing of the gunk slurry with water takes place downhole as the two fluids are commingled. In some cases, there is some control over the ratio of gunk slurry to water, in other cases not even this is controlled. Since gunk only achieves adequate flow resistance to form a plug within a certain range of gunk/water ratios, the performance of gunk as a plugging agent has been erratic. In particular, gunk is seldom useful for blowout control because the requirement of having the proper gunk/water ratio is difficult to satisfy.

Another technique involves placing a high density barite slurry (barium sulfate) in the annulus adjacent to the high pressure zone to provide the extra hydrostatic head needed to stop or prevent formation fluid influx. If the barite slurry remains deflocculated after placement at the bottom of the well and relatively undisturbed, the barite settles uniformly to form a hard plug. One problem with using barite to form a plug, however, is that barite's ability to form a plug varies greatly depending upon the quality of barite used. For example, it is sometimes difficult to plug a well in the presence of a significant flow movement in the wellbore. If the fluid influx is not killed immediately by the hydrostatic head of the barite slurry, the setting barite will usually not stop the unwanted flow.

DESCRIPTION OF THE FIGURES

FIG. 4 correlates the low shear thickening times and paste strength after high shear of API bentonite well control fluids as a function of the aqueous phase weight percent of polymer (P-250).

FIG. 5 correlates the low shear thickening times and paste strength of API bentonite well control fluids as a function of the oil phase weight percent of surfactant.

DISCLOSURE

Figure 1:
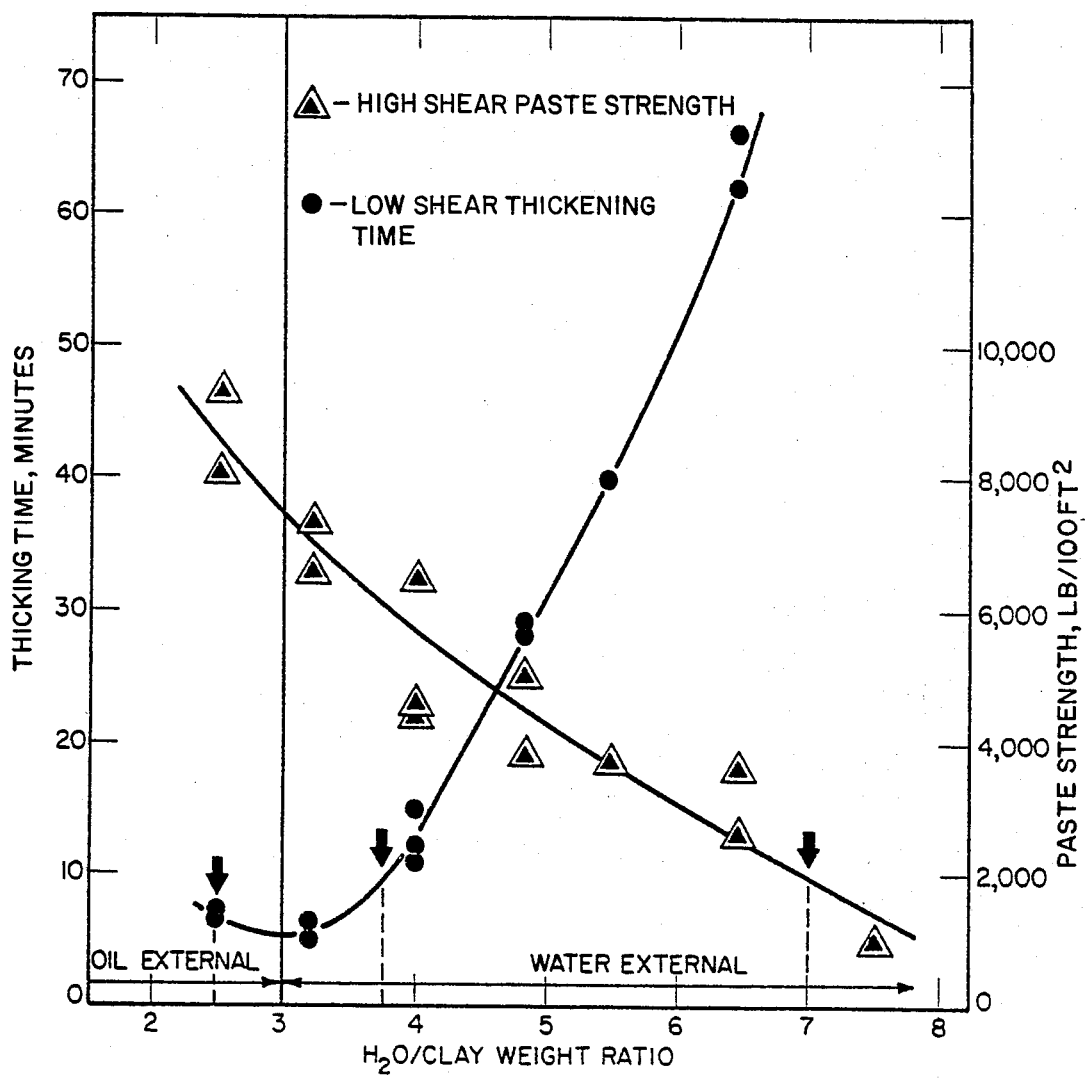
FIG. 1 correlates the low shear thickening time and paste strength after high shear of an API bentonite well control fluid as a function of the $H_2O$/clay weight ratio (0.48 surfactant/clay; 1.0 oil/clay; 0.065 polymer/clay).

The composites of the instant invention solve the numerous well-control problems, particularly the problems of blowout control and lost circulation zone control. A low viscosity material, stable to pumping, is pumped down a well pipe and subjected to a high shear as by being forced through the orifices of a drill bit at a point where it is desired to plug the wellbore, thief zone or zone of unwanted fluid flow. Upon exiting the drill bit (and thereby being subjected to shear forces which rupture the oil memorane separating the clay and the water-polymer phases) the material sets up into an extremely high viscosity, semi-rigid, high strength paste which itself can have a shear strength of at least 2000 pounds per 100 square feet.

The shear thickening fluids of the instant invention are a multi-component composite, comprising a water-swellable material (for the purposes of this specification, the term "clay" shall be employed) which preferably can broadly be described as any clay which in the presence of the water-polymer solutions employed, swells into a high viscosity solid mass; a hydrophobic phase comprising a hydrocarbon component and a surfactant component; and an aqueous phase component made up of water and a water-swellable/water-soluble polymer. Enough clay is employed so that on interaction with the water-polymer, a paste having a strength of at least 2000 lbs/100 ft$^2$ is formed.

The preferred clays useful in the instant invention would include any members of the montmorrillonite (smectite) group or the attapulgite group. Clays which swell strongly and absorb large quantities of water will perform better in this invention than those which do not. Clays which have been chemically treated, as with soda ash or sodium polyacrylate, to increase their ability to absorb water and form a stiff paste will show improved performance in the instant invention. It must be noted that if the water used has sufficient impurities, such as salt, in it to interfere with the absorption of the water by the clay, then that water will not perform well in the instant invention.

In general, the hydrocarbon phase comprises a liquid oil, preferably any low aromatic content oil, typically mineral oil, paraffinic oils of from 6 to 1000 carbons (provided they are liquid at the temperature at which they are employed—that is, during composite preparation and utilization) motor oils such as diesel fuel or kerosene, substituted paraffinic oils wherein the substituents are selected from the group consisting of halogens, amines, sulfates, nitrates, carboxylates, hydroxyls, etc. Preferred oils are the $C_6$–$C_{200}$ liquid paraffin.

These hydrophobic nonaqueous materials are mixed with oil soluble surfactants so as to enhance their surface activity. A wide variety of surfactants can be used in the process of the instant invention. These surfactants include anionic, cationic, nonionic, and ampholytic surfactants. These surfactants are described in the book, *Surfact Active Agents and Detergents*, by Schwartz, Perry and Beich, Interscience Publishers, Inc., N.Y., NY.

The only requirement which must be met by the surfactant is that it be able to stabilize the aqueous phase droplets and clay particles in the oil phase sufficiently to protect the mixture from premature gelling under low shear mixing conditions.

Anionic surfactants include carboxylic acids, i.e., fatty acids, resin acids, tall oil acids and acids from paraffin oxidation products. Also included among the anionic surfactants are alkyl sulfonates, alkyl-aryl sulfonates, mahogany and petroleum sulfonates, phosphates and lignin derivatives.

Cationic surfactants include quaternary ammonium compounds, e.g., salts of long chain primary, secondary and tertiary amines as well as quaternary amine salts with 7 to 40 carbon atoms. Styrene copolymers containing pendant quaternary ammonium groups including derivatives of trimethylamine or dimethylethanolamine are also useful cationic surfactants.

Unprotonated amines fall into the class of non-ionic surfactants. A preferred group of amines have the general formula:

wherein R, $R_1$ and $R_2$ may be independently selected from the group consisting of hydrogen, $C_1$ to $C_{20}$ alkyl, $C_6$ to $C_{20}$ aryl and $C_7$ to $C_{20}$ alkylaryl radicals.

Various polyamine derivatives are useful within the scope of the instant invention. The preferred polyamine derivatives are those having the general formula:

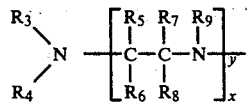

wherein $R_3$, $R_4$, $R_5$, $R_6$, $R_7$, $R_8$, $R_9$ and y are chosen from the group consisting of hydrogen, $C_1$ to $C_{20}$ alkyl, $C_6$ to $C_{20}$ aryl, $C_7$ to $C_{20}$ alkaryl radicals and substituted derivatives thereof, and x is an integer of from 1 to 100. The substituted derivatives are preferably selected from the group consisting of oxygen, nitrogen, sulfur, phosphorus and halogen containing derivative. The most preferred material is:

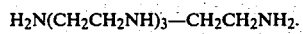

$H_2N(CH_2CH_2NH)_3$—$CH_2CH_2NH_2$.

In general, the preferred surfactants are the products obtained by the reaction of the polyamine described above with various polyalkenyl succinic anhydrides, such as polyisobutylene succinic anhydride, polypropenyl succinic anhydride and polyisobutenyl succinic anhydride.

A preferred polyamine derivative, formed by reacting together an alkyl succinic radical and the polyamine, has the general formula:

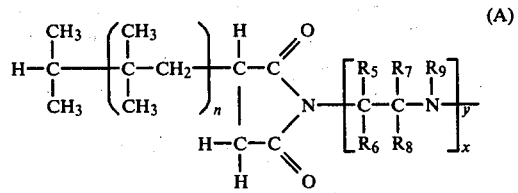

(A)

wherein n varies from 10 to 60, preferably 10 to 30, most preferably 15–17; x varies from 1 to 100, preferably 3 to 10; $R_5$, $R_6$, $R_7$, $R_8$ and $R_9$ are hydrogen $C_1$ to $C_{20}$ alkyl, $C_7$ to $C_{20}$ alkaryl radical and substituted derivatives thereof, preferably hydrogen and y is selected from the group consisting of hydrogen and oxygen containing hydrocarbyl radicals having up to 10 carbons, e.g., acetyl. Typically, the surfactants have a molecular weight on the order of 1000. A most preferred characteristic of the surfactants is oil solubility.

Nonionic systems also include the polyethenoxy surfactants, i.e., polyethoxy ethers of alkyl phenols, polyethoxy ethers of alcohols, etc. The polyethenoxy ethers are especially useful as their solubility may be varied according to the weight of ethylene oxide added to the alkyl phenol starting material. Another non-ionic surfactant which is particularly useful is sorbitan monooleate which is known in the trade by the name of Span-80 and manufactured by the Atlas Chemical Company. Ampholytic surfactants contain both an acidic and a base function in their structure and therefore will be cationic or anionic according to the pH of the solution in which they are dissolved.

The final component of the shear sensitive well control fluids of the instant invention is an aqueous phase comprising water and a water soluble polymer. Typical polymers include polyacrylamides including homopolymers, acrylamide lightly cross-linked by between about 500 and 5000 parts per million by weight of the monomers present with such agents as methylene-bisacrylamide or divinyl benzene, and a major portion of acrylamide copolymerized with a minor portion of other ethylinically unsaturated monomers copolymerizable there with; or polystyrene sulfonate and polyvinyltoluene sulfonate and water soluble salts thereof; and polyvinyl alcohol. The preferred water-swellable/water-soluble polymer is polyacrylamide. This polymer may be used in either the hydrated or unhydrated form. The degree of hydration may range from 0–50%, preferably 0–15%, most preferably 0–7% or less.

The polyacrylamides and related polymers which can be used in the practice of the present invention include polymers selected from the group consisting of polyacrylamides and polymethacrylamides wherein up to about 75 percent of the carboxamide groups can be hydrolyzed to carboxyl groups; polyacrylic acid and polymethacrylic acid; polyacrylates; polymers of N-substituted acrylamides wherein the nitrogen atoms in the carboxamide groups can have from 1 to 2 alkyl substituents which contain from 1 to 4 carbon atoms, copolymers of acrylamide with another ethylenically unsaturated monomer copolymerizable therewith, sufficient acrylamide being present in the monomer mixture to impart said water-soluble properties to the resulting copolymer when it is mixed with water, and wherein up to about 50 percent of the carboxamide groups can be hydrolyzed to carboxyl groups; and admixtures of such polymers.

Presently preferred polyacrylamide type polymers include the various substantially linear homopolymers and copolymers of acrylamide and methacrylamide. By substantially linear it is meant that the polymers are substantially free of cross-linking between the polymer chains.

All the polymers useful in the practice of the invention are characterized by having high molecular weight. The molecular weight is not critical so long as the polymer has the above described water-soluble properties. It is preferred that the polymer have a molecular weight of at least 10,000, more preferably 100,000, most preferably 2,000,000+. The upper limit of molecular weight is unimportant so long as the polymer is at least water-soluble. Thus, polymers having molecular weights as high as 10,000,000 or higher, and meeting said conditions, can be used.

It has been discovered that the use of the water soluble polymer, such as polyacrylamide serves three beneficial functions. First, it slows down hydration of the clay (thereby retarding thickening) and keeping the clay/oil-surfactant/polymer composite pumpable for a prolonged period of time. It is postulated that this occurs through this formation of a polymer coating around each clay/oil globule. Second, when subjected to a shear, as encountered upon being pumped out through the orifices of the drill bit, the oil-surfactant envelope (and the polymer coating) are sheared, the clay and water polymer mix and a high strength paste is formed by the interaction of the clay and aqueous polymer. Third, high molecular weight linear polymers reduce viscous drag and make the composite more easily pumpable. It has been determined that the degree of hydrolysis of the polyacrylamide has a direct effect on the behavior of the material mixtures. Unhydrolyzed polyacrylamide results in a material which has a greater ultimate paste strength, but has lower pregelling stability. Hydrolyzed polymer, on the other hand gives the material with a greater degree of stability but reduces the strength of the ultimate paste. Degree of hydrolysis may range, therefore, as previously stated, from 0 to 50%, preferably 0 to 15%, more preferably 0-7% or less. It has been determined that, within the above constraint, thickening (i.e., stability) is roughly independent of polymer concentration within the concentration ranges recited, while gel strength tends to increase with increased polymer concentrations.

In another embodiment, the aqueous polymer solution into which the encapsulated water swellable material is slurried prior to pumping and shearing is pH adjusted by the addition of acid or base. This pH adjustment has the effect or permitting modification and balancing of the stability of the composite in comparison to the strength of the final thick paste obtained and the set-up time of the material— that is, the elapsed time between hydrophobic layer rupture component mixing and maximum paste strength. The more acidic the aqueous polymer solution is, the longer is the set-up time, and the weaker is the paste but the composite has greater pre-rupture stability. The reverse is true when the aqueous polymer phase is basic, i.e., when basic, the stability decreases but the set-up time is shorter and the paste is of higher strength. It is possible to have the best of both systems by employing an acidic aqueous polymer phase in which is dispersed an encapsulated base in the oil phase. A portion of the same hydrophobic nonaqueous material-surfactant utilized to encapsulate the water swellable material can be utilized to encapsulate a base solution which will be released under shear and change the pH, at the moment of the contacting of the aqueous polymer solution and the water swellable material, to basic, thus obtaining a short set-up time and a commensurate increase in paste strength. Alternatively, the base can be emulsified in the hydrophobic nonaqueous material-surfactant to yield a composite which is then used as such to encapsulate the water swellable material. Any acid-base combination which is nonreactive with the components of the system can be utilized preferably HCl/NaOH.

The greatest stability is obtained at pH's in the range of 4 to 6 while the shortest set-up times and highest strengths are obtained at pH's in the range of 9-12. The choice of the concentrations of material used to achieve the acid-encapsulated base balance is left to the discretion of the practitioner as determined by his immediate needs in the field.

| Summary of Representative Acrylamide Polymer Properties | | | |
|---|---|---|---|
| Brand Name | Manufacturer | M.W. | Degree of Hydrolysis |
| Cyanamer P-250 | American Cyanamid | 5-6MM | 1% |
| Separan NP-10 | Dow Chemical | 4MM | 3-7% |
| Separan MGL | Dow Chemical | 7-8MM | 1% |
| Pusher | Dow Chemical | 10-12MM | 50% |

| Results with Non-Acrylamide Polymers | | | |
|---|---|---|---|
| Polymer Type | Brand Name | Manufacturer | Comments |
| Anionic | Primafloc A-10 | Rohm & Haas | No Gel Formed with Bentonite |
| Carboxy Methyl Cellulose | Cellulose Gum | Hercules | No Gel Formed with Bentonite |
| Xanthum Gum | Keltrol | Kelco | No Gel Formed with Bentonite |
| Polyethylene Oxide | Polyox | Union Carbide | Forms Moderately Strong, Sticky Gel with Bentonite |
| N—vinyl-2-pyrrolidone | | Monomer-Polymer Labs. Division of Haven Industries | No Gel Formed with Bentonite |

On certain drilling sites, such as offshore platforms, storage space is at a premium. It would be particularly desirable to be able to formulate a well control fluid from materials that are normally on-hand at the drilling site. Of the five major ingredients—water, clay, oil, surfactant and polymer—the first three are usually available in some form at most drilling sites. Thus, only the last two would need to be stored and since these two are minority components, their storage problem is minimized. In the following examples, we elucidate the performance of our invention by limiting the oil to diesel fuel and the clay to API bentonite, two materials commonly on-hand at most drilling sites. However, we do not mean to imply a limitation to the scope of our invention by these examples.

EXPERIMENTAL

A. Sample Preparation

Our two phase mixtures are prepared according to the following procedure:

1. Weigh out surfactant/dispersant and oil into an 8 oz. wide mouth jar and mix thoroughly with a spatula.
2. Weigh in bentonite and mix thoroughly with a spatula.
3. Weight in aqueous polyacrylamide and mix thoroughly with a spatula.
4. Cover jar and shake for ten seconds.
5. Pour contents into a Waring blender and mix at medium speed until blender slows or two minutes has elapsed.
6. Remove product and place in a 4 oz. wide mouth jar for strength test.

B. Strength Test

The strength test is performed with a shear tube obtained from the Baroid Division of National Lead. The shear tube is a hollow cylindical tube with sharp edges. The distance this tube penetrates a sample in one minute is used to calculate the shear strength according to the following formula (see Shearometer calibration curves* for details).
[*obtainable from National Lead.]

Shear Strength (lb/100 ft$^2$) =

$$\frac{\text{Weight on shear tube in grams} \times 30}{\text{(\# inches penetrated in one minute)}}$$

The strength test procedure consists of:

1. A 16 oz. wide mouth jar with a hole drilled in its plastic cover is used as the receptable for the shear tube and sample.
2. A 4 oz. wide mouth jar, filled completely with the sample, is placed inside the larger jar, and the larger jar is covered.
3. The shear tube is then placed through a hole drilled in the cover of the larger jar and pushed 0.2 inches into the sample.
4. The height of the top of the shear tube from the top of the cover is recorded.
5. Lead weights are then placed on top of the shear tube for one minute.
6. The distance the shear tube penetrates the sample while it is weighted is measured.
7. The shear strength is calculated according to the formula given at the beginning of this section.

C. Stability Test

1. Prepare sample according to Sample Preparation procedure.
2. Place sample in a 250 ml Pyrex beaker.
3. Place beaker in a water bath, preheated to 95° C.
4. Place watch glass over sample.
5. Cover water bath with aluminum foil.
6. Check every five minutes by stirring with a spatula to see if system appears to be pumpable (no free water).
7. Record time when no longer pumpable.

THE EFFECT OF DEGREE OF HYDROLYSIS OF POLYACRYLAMIDE ON STABILITY

Purpose:
To examine the effect on stability of various degrees of hydrolysis in commercially available polyacrylamides.

Experimental:
Each system contained,
15 g Diesel Fuel
7.5 g Paranox 106 (Exxon Chemical Co)
25 g API Bentonite
80 g, water, or 1 wt.% Separan NP-10, or 1 wt.% Separan MGL, or 0.5 wt.% Dow Pusher, all adjusted to a pH of 5.6 with HCl.

| Aqueous Phase | Degree of Hydrolysis | M.W. | Stability (Minutes) |
|---|---|---|---|
| Water | N.A. | N.A. | 10 |
| 1% MGL | 1% | 7–8MM | 35 |
| 1% NP-10 | 3–7% | 4MM | 65 |
| 0.5% Dow Pusher | 50% | 10–12MM | 90 |

Conclusions:
The greater the degree of hydrolysis, the greater the stability.

THE EFFECT OF HYDROLYSIS OF POLYACRYLAMIDE ON ULTIMATE STRENGTH

Purpose:
To examine the effect on strength, of relative degree of hydrolysis, by hydrolyzing polyacrylamide.

Experimental:
700 g of 1% Cyanamer P-250 was mixed with 48 g of 0.1 NaOH at 95° C. and gave an initial pH of 11.4. The mixture was kept at this temperature and aliquots were removed every 20 minutes. Their viscosity and pH were determined in order to follow the hydrolysis reaction. The polymer in these aliquots were used to prepare samples for the strength tests. Each sample contained:
15 g Diesel fuel
7.5 g Paranox 106 (Exxon Chemical Co.)
15 g API Bentonite
100 g, 1% P-250, treated 0 or 20 or 40 or 60 minutes.

| Time of Hydrolysis (min.) | pH | Viscosity (cp) | Strength w/500 g wt. |
|---|---|---|---|
| 0 | 11.4 | 178 | 1900 (lb/100 ft$^2$) |
| 20 | 11.15 | 214 | 1400 (lb/100 ft$^2$) |
| 40 | 11.05 | 237 | 1300 (lb/100 ft$^2$) |
| 60 | 10.75 | 253 | 1200 (lb/100 ft$^2$) |

Conclusions:
The greater the degree of hydrolysis, the weaker the strength.

MEASURING THE EFFECT OF pH ON GEL STRENGTH OF 0.8% POLYACRYLAMIDE SYSTEMS

Purpose:
To examine the effect on gel strength and set-up time of the pH of 0.8% aqueous polyacrylamide solutions.

Experimental:
Each system contained:
15 g Diesel Fuel
7.5 g Paranox 106 (Exxon Chemical Co.)
15 g API Bentonite
100 g, 0.8% Cyanamer P-250 polyacrylamide

| | Results | |
|---|---|---|
| pH | Set-Up Time | Strength w/700g wt. (lb/100 ft²) |
| 9.2 | 40–45 sec. | 3,500 |
| 9.5 | 30–35 sec. | 4,700 |
| 10.2 | 25–30 sec. | 4,600 |
| 10.5 | 10–15 sec. | 3,500 |
| 11.15 | 10–15 sec. | 2,300 |

Conclusions:

An optimum pH exists for 0.8% polyacrylamide solutions with respect to fastest set-up time and maximum gel strength. This pH is 9.5–10.0.

MEASURING THE EFFECT OF pH ON GEL STRENGTH OF 2% POLYACRYLAMIDE SYSTEMS

Purpose:

To examine the effect on gel strength and set-up time of the pH of 2% aqueous polyacrylamide solutions.

Experimental:

Each system contained:

15 g Diesel Fuel
7.5 g Paranox 100
15 g API Bentonite
100 g, 2% Cyanamer P-250 polyacrylamide

| | Results: | |
|---|---|---|
| pH | Set-Up Time | Strength w/700g wt. (lb 100 ft²) |
| 9.5 | 35–40 sec. | 3,300 |
| 9.7 | 35–40 sec. | 3,000 |
| 10.5 | 15–20 sec. | 4,300 |
| 11.1 | 7–20 sec. | 6,000 |
| 12.2 | 15–20 sec. | 5,800 |

Conclusions:

An optimum pH exists for 2% polyacrylamide solutions with respect to fastest set-up time and maximum gel strength. This pH is approximately 11.1.

THE EFFECT OF pH ON STABILITY

Purpose:

To examine the effect of pH on stability in slightly hydrolyzed systems.

Experimental:

Each system contained, 15 g Diesel Fuel
7.5 g Paranox 106
25 g API Bentonite
80 g, 1% Separan NP-10 at various pH's. (pH adjusted with HCl or NaOH)

| pH of System | Stability (minutes) |
|---|---|
| 8.3 | 40 |
| 5.6 | 50 |
| 4.0 | 90 |

Conclusion:

The lower the pH the higher the stability.

The oil-surfactant phase will act as the barrier between the clay and the water-polymer phase preventing their interaction until such time as the oil surfactant phase envelope is ruptured by the application of a shear.

Preferably the clay component will be encapsulated in the previously defined oil phase (hydrocarbonaceous component and surfactant) and this encapsulated clay will in turn be suspended in the water-polymer phase wherein the water-polymer phase will exist as the continuous phase.

The clay and the water polymer phase are kept separate until such time as their mixing is deliberately desired. This mixing is accomplished by subjecting the composite to a shear force, such as by passage through the nozzle of a drill bit, of sufficient intensity to rupture the oil-phase envelope.

In the practice of the instant invention, the components may be present in the composite in the following ranges:

| | Part by Weight |
|---|---|
| Clay | 100 |
| Surfactant | 8–70 |
| Hydrocarbon | 30–140 |
| Polymer | 0.1–12 |
| Water | 240–700 |

Preferably, the composite will have its ingredients present in the following ranges:

| | Part by Weight |
|---|---|
| Clay | 100 |
| Surfactant | 9–36 |
| Hydrocarbon | 36–74 |
| Polymer | 2–12 |
| Water | 240–500 |

Most preferably, the composite will have its ingredients present in the following ranges:

| | Part by Weight |
|---|---|
| Clay | 100 |
| Surfactant | 10–12 |
| Hydrocarbon | 38–40 |
| Polymer | 3–4 |
| Water | 290–370 |

In the preferred embodiment, the clay is a bentonite clay, the polymer is polyacrylamide, the hydrocarbon oil is S100N, a $C_{30}$ paraffinic oil, and the surfactant is chosen from the group of materials having formula corresponding to compound A, previously defined. Most preferably, polyamines of the formula $A_1$ or $A_2$ (below) are employed.

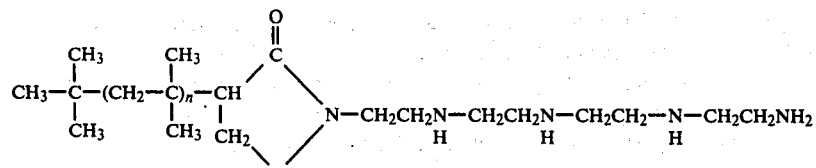

$A_1$

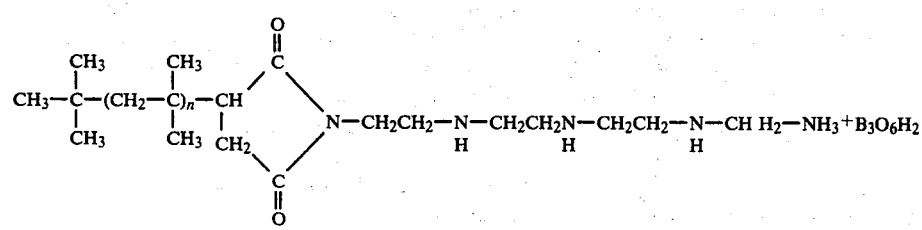

$A_2$

Surfactant $A_1$ is available as Paranox 100 from Exxon Chemical Co. while surfactant $A_2$ is available as Paranox 106 also from Exxon Chemical Co.

In addition, the composition may have included in it, either in the clay phase or in the water-polymer phase, preferably the clay phase, a fibrous material such as fiber glass, asbestos, wood fiber, cellulose, shreaded paper, cotton seed hulls, sugar cane bagasse, cow manure, peanut shells, etc., which is substantially impervious to the action of the water-polymer phase and to the oil phase. These added materials serve the purpose of imparting increased mechanical strength and rigidity to the paste which sets up, upon rupture of the oil envelope, when the clay and water-polymer phases interact.

The shear thickening fluid may also have added to it materials such as barite, hemalite, galena, ilmenite, etc., which are commonly used for increasing the density of drilling fluids. These weighting agents are not water-swellable and will not participate in the shear-thickening effect of the instant invention but would be added if higher density formulations were particularly desired. If used, the weighting agents will absorb some of the surfactant, especially if the agent is finely powdered. Consequently, an additional volume of surfactant would have to be added to make up for this absorbed portion, so as to maintain the stability of the composition.

In order to more accurately identify composites which will be useful under typical field conditions, a set of laboratory criteria was established to simulate the performance needed in the field. To this end, it was determined that for a composite to be useful, it must be pumpable, i.e., resistant to low shear forces for at least 5 minutes. It is also necessary that once mixed, sheared, and permitted to gel, the gel must have a strength of at least 2000 pounds per 100 sq. feet. The limits used to describe the operable ranges of the various components used in the composite were chosen so as to result in a composite satisfying these criteria.

The mixtures of the instant invention have been found to function quite well at temperatures of 270° F. or higher as would be actually encountered in well control situations.

Except for the proviso that the clay and the water-polymer are never mixed before introduction into the oil phase, the materials making up the composite may be mixed in any other.

In general, the oil/surfactant and clay are mixed together employing any convenient mixing apparatus. The clay can be added to premixed oil and surfactant, or clay can be added to the surfactant and then the oil added or vice-versa. Alternatively, the oil can be added to the clay and then the surfactant added, or the oil surfactant combination can be added to the clay. Any technique is acceptable as long as the clay becomes encapsulated by the oil-surfactant phase. Preferably, the oil and surfactant are mixed together first and then the clay is added. This results in the formation of a clay in oil/surfactant emulsion. Next this encapsulated clay has added to it or is itself added to the premixed water/polymer solution. The resulting material normally will have a water continuous-suspension phase.

EXPERIMENTAL

Preparation of Bentonite Shear Thickening Well Control Fluid

Ingredients:
API Bentonite
Paranox 106 Surfactant
S100N Oil
P-250 Polymer Distilled Water In the following examples, all samples of shear thickening well control fluid were prepared according to the following general procedure:

(1) a known weight of surfactant was dissolved in a known weight of oil;

(2) a known weight of bentonite was added to the oil/surfactant solution;

(3) the mixture was stirred for one minute by hand with a spatula to insure thorough dispersion of the clay in the oil and then permitted to stand for four minutes to insure sufficient time for the surfactant to coat the clay surface;

(4) the encapsulated clay mixture was then added all at once to a known weight of polyacrylamide solution (previously prepared by the dissolution of a known weight of polymer in a known weight of distilled water) and suspended as globules in the polyacrylamide solution by mixing for one minute with a spatula at 100 to 200 RPM. This is described as a "water" continuous phase system;

(5) the suspension was poured into a jacketed low-shear mixing cell in which a typical egg beater impeller was rotating at 500 RPM and the suspension was brought to thermal equilibrium at 95° C.

It should be noted that we have prepared systems in which the oil+surfactant+clay mixture was added to the aqueous polymer. This addition has been performed in one of two ways: (1) continuously with stirring, or (2) all at once addition. Also, mixing has been accomplished by pumping the oil+surfactant+clay mixture through one pump and the aqueous surfactant through another pump, to have the two streams mix as they enter the drillpipe. When the aqueous polymer was added continuously with stirring to the oil+surfactant+clay mixture, the system was initially oil-continuous; however, when sufficient aqueous polymer was added to achieve the desired concentration in the final composition, the emulsion inverted and became water continuous.

In order to more accurately identify composites which will be used under typical field conditions, a set of laboratory criteria was established to simulate the minimum performance needed in the field. To this end, it was determined that for a composite to be useful, it must be pumpable, i.e., resistant to low shear forces for at least 5 minutes. It is also necessary that once sheared, mixed and thickened, the material must have a strength of at least 2000 pounds per 100 sq. feet. The limits used to describe the operable ranges of the various components used in the composite were chosen so as to result in a composite satisfying these criteria.

The strength of sheared well control fluid was measured by use of the shear tube (National Lead, Baroid Division) previously described, and the shear strength equation.

In order to insure uniformity and the development of maximum strength, all samples of paste were kneaded by hand prior to the measurement of strength. In a separate experiment, the development of maximum strength by hand kneading and by passage through a high shear jet nozzle ($\frac{1}{4}$" orifice with a pressure drop of 1500 psi) were shown to be approximately equivalent. Therefore, strength determined after kneading has been identified as "high shear" paste strength.

Figure 2:
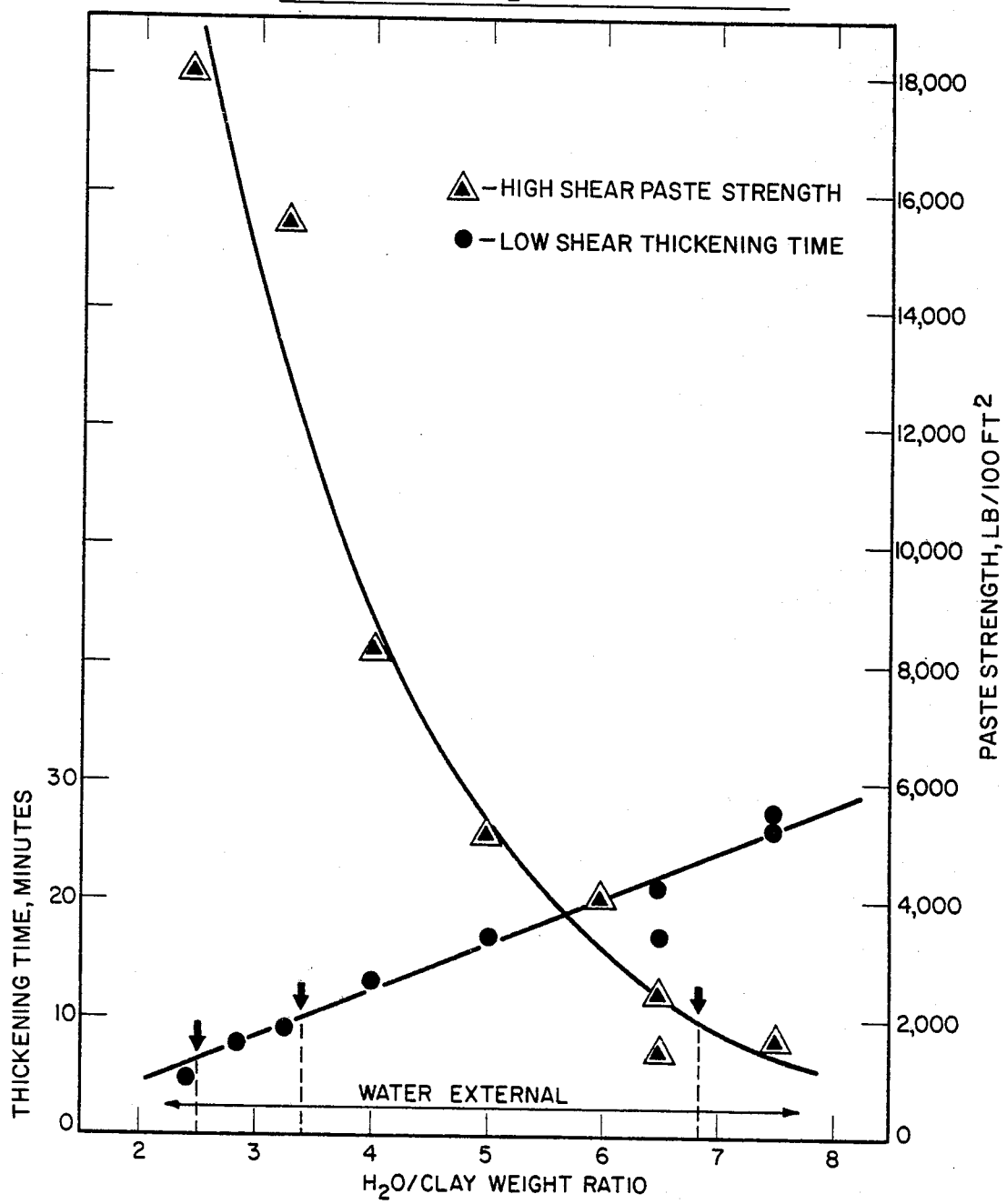
FIG. 2 correlates the low shear thickening time and paste strength after high shear of an API bentonite well control fluid as a function of the $H_2O$/clay weight ratio (0.24 surfactant/clay; 0.49 oil/clay; 0.032 polymer/clay).
Figure 3:
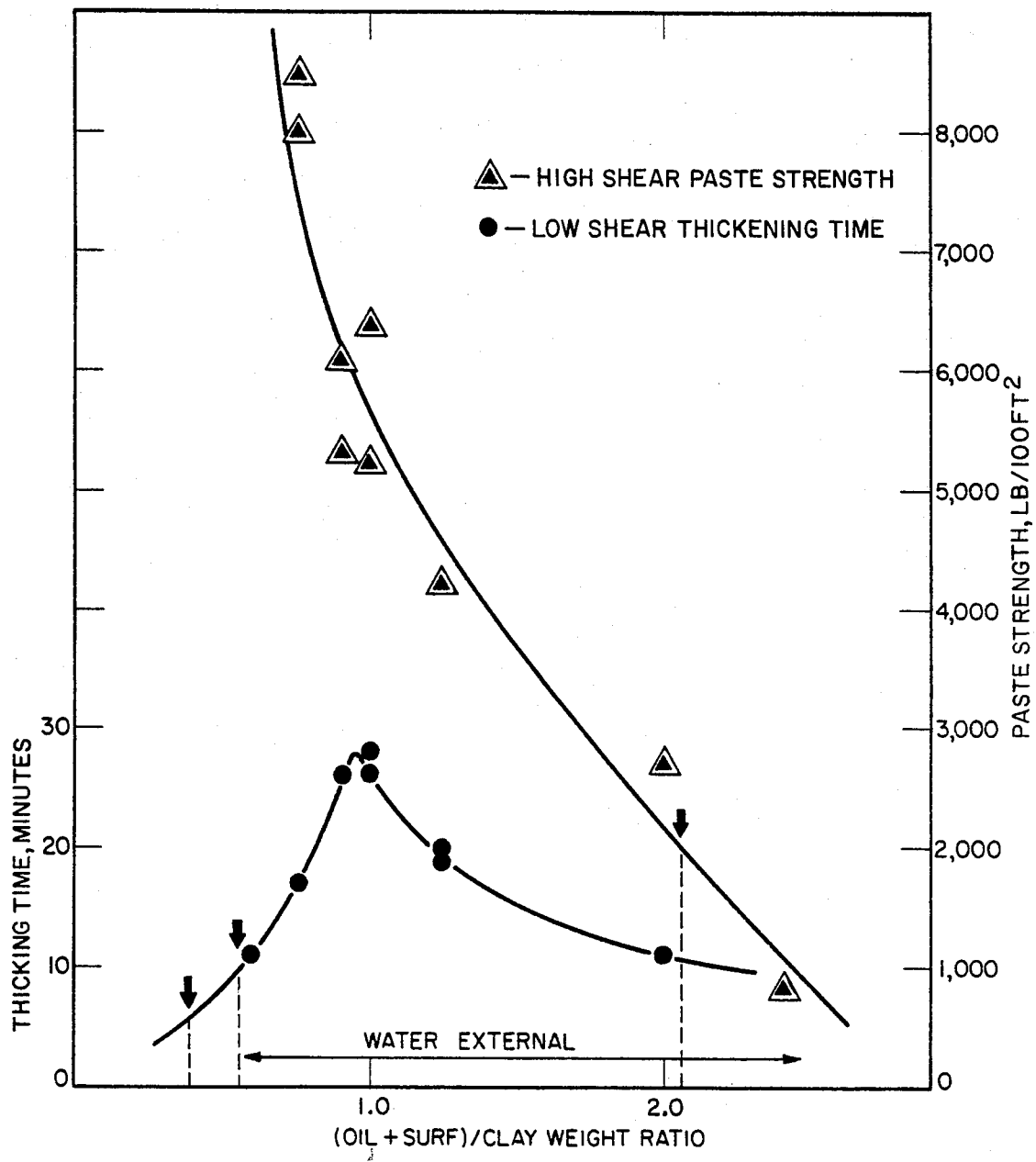
FIG. 3 correlates the low shear thickening times and paste strength after high shear of API bentonite well control fluids as a function of the oil+surfactant/clay weight ratio.

A set of data delineating the influence of composition on low shear stability and high shear paste strength of well control fluid using API Bentonite are given in FIGS. 1 through 5. The same data is given in tubular form in Tables 1 through 5.

In the practice of this invention, it is necessary to choose a specific recipe, from the ranges given that will perform well in the particular situation at hand. Examples of uncontrolled variables which will influence the selection of a recipe are:

1. The depth in a wellbore at which the treatment is to be applied.
2. The temperature downhole where the treatment will be applied.
3. The type of mixing and pumping equipment which will be used to prepare the material and inject it into the wellbore.
4. The type of unwanted flow or flow channel to be blocked.

It has been determined that the use of a water soluble polymer, such as polyacrylamide, serves three beneficial functions. First, it forms a polymer coating around each clay/oil globule which tends to slow down the hydration of the clay. This retards paste formation, keeping the clay/oil/surfactant-water/polymer composite pumpable for a longer period of time. Second, high molecular weight linear polymers reduce viscous drag and make the composite more easily pumpable. Third, when subjected to a high shear, as encountered upon exiting the drill bit, the oil/surfactant envelope and the polymer coating are ruptured and in the resulting turbulence, the clay and the water/polymer mix to form a high strength paste.

Thus it has been determined that the hydrolysis of the polyacrylamide has a direct effect on the behavior of the material mixtures. Unhydrolyzed polyacrylamide results in a material which has a greater ultimate gel strength, but has lower pregelling stability. Hydrolyzed polymer, on the other hand, gives the material a greater degree of stability but reduces the strength of the ultimate gel. Degree of hydrolysis may range, therefore, from 0% to 50%, preferably 0 to 15%, more preferably 1 to 7% or less.

EXAMPLE 1

The following example illustrates the practice of the instant invention on a laboratory scale. The many different recipes tested in this example will clarify the relationship between composition and performance.

The ingredients used in the recipes of this example are specifically identified as follows:

Oil—S-100N paraffinic oil available from Exxon Co., U.S.A.

Surfactant—Available as Paranox 106 surfactant available from Exxon Chemical Co., U.S.A.

Clay—API Bentonite, available from the Magcobarn Division of Dresser Industries (200 Mesh)—Ground and sieved KWK Bentonite available from American Colloid Co. (100—10 Mesh)

Polymer—P-250 polyacrylamide available from American Cyanamid Co. (Approximately 0-1% hydrolyzed).

Listings of paste strength before and after application of high shear as a function of low shear mixing time at different water/clay ratios are given in Tables 1 and 2. These Tables show that stability increases with water content and ultimate strength increases with clay content. The effect of (oil+surf.)/clay ratio is shown in Table 3. This table shows that an increase in the ratio of oil+surfactant to clay weakens the product, while the stability appears to go through a maximum value at a particular (oil+surf.)/clay ratio. The effect of polymer concentration as shown in Table 4 indicates that increasing polymer concentration in the range studied increases product strength, while stability appears to go through a maximum value at approximately one percent polymer in the aqueous phase. In Table 5, we examine the effect of surfactant concentration in the oil phase. Stability appears to go through a maximum at an optimum surfactant concentration of approximately 33% while strength appears to be roughly independent of surfactant concentration.

TABLE 1

LOW SHEAR THICKENING TIMES AND PASTE STRENGTHS OF API BENTONITE WELL CONTROL FLUID AFTER APPLICATION OF HIGH SHEAR AS A FUNCTION OF $H_2O$/CLAY WEIGHT RATIO*

| Sample # | Surfactant Paranox 106 Grams | Oil S100N Grams | Clay API Bentonite Grams | Polymer Cyanamer Grams | Water Distilled Grams | $H_2O$/Clay Weight Ratio | Low Shear Thickening Time Minutes | Paste Strength after High Shear LB/100 FT |
|---|---|---|---|---|---|---|---|---|
| 24 | 11.1 | 22.9 | 23 | 1.5 | 148.5 | 6.46 | 62 | 2800 |
| 25 | 11.1 | 22.9 | 23 | 1.5 | 148.5 | 6.46 | 66 | 2300 |
| 27 | 11.1 | 22.9 | 23 | 1.5 | 125.75 | 5.47 | 40 | 3700 |
| 26 | 11.1 | 22.9 | 23 | 1.5 | 111.0 | 4.83 | 28 | 3800 |
| 30 | 11.1 | 22.9 | 23 | 1.5 | 111.0 | 4.83 | 29 | 3700 |
| 31 | 13.5 | 28.0 | 28.1 | 1.83 | 135.6 | 4.83 | 29 | 5000 |
| 29 | 11.1 | 22.9 | 23 | 1.5 | 92.25 | 4.01 | 15 | 4400 |
| 46 | 11.1 | 22.9 | 23 | 1.5 | 92.25 | 4.01 | 12 | 7000 |
| 47 | 13.8 | 31.3 | 30.5 | 1.99 | 122.4 | 4.01 | 11 | 4600 |
| 28 | 11.1 | 22.9 | 23 | 1.5 | 73.5 | 3.20 | 5 | 7300 |
| 312 | 22.2 | 45.8 | 46 | 3.0 | 147.0 | 3.20 | 6.3 | 6600 |
| 310 | 11.1 | 22.9 | 23 | 1.5 | 57.5 | 2.50 | 6.9 | 8100 |
| 311 | 27.75 | 57.25 | 57.5 | 3.75 | 143.75 | 2.50 | 7.1 | 9300 |

*Fixed surfactant/clay (0.48) oil/clay (1.0), and polymer/clay (0.65) weight ratios

TABLE 2

LOW SHEAR THICKENING TIMES AND PASTE STRENGTHS OF API BENTONITE WELL CONTROL FLUID AFTER APPLICATION OF HIGH SHEAR AS A FUNCTION OF $H_2O$/CLAY WEIGHT RATIO*

| Sample # | Surfactant Paranox 106 Grams | Oil S100N Grams | Clay API Bentonite Grams | Polymer Cyanamer P-250 Grams | Water Distilled $H_2O$ Grams | $H_2O$/Clay Weight Ratio | Low Shear Thickening Time Minutes | Paste Strength After High Shear LB/100 $FT^2$ |
|---|---|---|---|---|---|---|---|---|
| 32 | 11.1 | 22.9 | 46 | 1.50 | 111 | 2.41 | 5 | 19,000 |
| 36 | 8.4 | 17.6 | 36 | 1.18 | 102 | 2.84 | 8 | 11,900 |
| 35 | 8.4 | 17.6 | 36 | 1.18 | 117 | 3.25 | 9 | 15,500 |
| 37 | 8.4 | 17.6 | 36 | 1.18 | 144 | 4.00 | 13 | 8,200 |
| 38 | 8.4 | 17.6 | 36 | 1.18 | 180 | 5.00 | 17 | 9,100 |
| 39 | 8.4 | 17.6 | 36 | 1.18 | 216 | 6.00 | 20 | 4,000 |
| 40 | 5.7 | 11.8 | 24.2 | 0.80 | 157 | 6.50 | 17 | 2,400 |
| 41 | 8.4 | 17.6 | 36 | 1.18 | 234 | 6.50 | 21 | 1,450 |
| 42 | 8.4 | 17.6 | 36 | 1.18 | 270 | 7.50 | 22–30 | — |
| 43 | 5.0 | 10.6 | 21.6 | 0.70 | 162 | 7.51 | 26–29 | 1,650 |

*Fixed surfactant/clay (0.24), oil/clay (0.49), and polymer/clay (0.033) weight ratios

TABLE 3

LOW SHEAR THICKENING TIMES AND PASTE STRENGTHS OF API BENTONITE WELL CONTROL FLUID AFTER APPLICATION OF HIGH SHEAR AS A FUNCTION OF (OIL + SURF)/CLAY WEIGHT RATIO*

| Sample # | Surfactant Paranox 106 Grams | Oil S100N Grams | Clay API Bentonite Grams | Polymer Cyanamer P-250 Grams | Water Distilled $H_2O$ Grams | "Oil"/Clay Weight Ratio | Low Shear Thickening Time Minutes | Paste Strength After High Shear LB/100 $FT^2$ |
|---|---|---|---|---|---|---|---|---|
| 60 | 6.0 | 12.3 | 30.5 | 1.24 | 123 | 0.60 | 12 | 10,800 |
| 52 | 5.6 | 11.6 | 23 | 0.94 | 92.2 | 0.75 | 17 | 8,500 |
| 55 | 7.5 | 15.4 | 23 | 0.94 | 92.2 | 0.75 | 17 | 8,000 |
| 316 | 8.9 | 18.6 | 30.5 | 1.24 | 123 | 0.90 | 34 | 6,100 |
| 57 | 8.9 | 18.6 | 30.5 | 1.24 | 123 | 0.90 | 26 | 5,300 |
| 51 | 7.5 | 15.5 | 23 | 0.94 | 92.2 | 1.00 | 26 | 6,400 |
| 56 | 9.9 | 20.6 | 30.5 | 1.24 | 123 | 1.00 | 28 | 5,221 |
| 315 | 9.3 | 19.2 | 23 | 0.94 | 92.2 | 1.24 | 20 | 4,200 |
| 54 | 9.3 | 19.2 | 23 | 0.94 | 92.2 | 1.24 | 19 | 8,800 |
| 53 | 15.0 | 31.0 | 23 | 0.94 | 92.2 | 2.00 | 11 | 2,700 |
| 59 | 18.7 | 38.8 | 23 | 0.94 | 92.2 | 2.50 | — | 700 |

*Fixed (Oil + Surf) = 32.5% $A_2$ in S100N; fixed $H_2O$/clay (4.0) and polymer/clay (0.041) weight ratios

TABLE 4

LOW SHEAR THICKENING TIMES AND PASTE STRENGTHS OF API BENTONITE WELL CONTROL FLUID AFTER APPLICATION OF HIGH SHEAR AS A FUNCTION OF AQUEOUS PHASE WEIGHT % P-250*

| Sample # | Surfactant Paranox 106 Grams | Oil S100N Grams | Clay Bentonite Grams | Polymer Cyanamer P-250 Grams | Water Distilled $H_2O$ Grams | Aqueous Phase Weight % P-250 | Low Shear Thickening Time Minutes | Paste Strength After High Shear LB/100 $Ft^2$ |
|---|---|---|---|---|---|---|---|---|
| 104 | 9.9 | 20.6 | 30.5 | 0 | 124.5 | 0 | 4 | 2,200 |
| 120 | 9.9 | 20.6 | 30.5 | 0.31 | 124.2 | 0.25 | 14 | 3,400 |
| 106 | 9.9 | 20.6 | 30.5 | 0.62 | 122.9 | 0.50 | 23 | 5,600 |

TABLE 4-continued
LOW SHEAR THICKENING TIMES AND PASTE STRENGTHS OF API BENTONITE WELL CONTROL FLUID AFTER APPLICATION OF HIGH SHEAR AS A FUNCTION OF AQUEOUS PHASE WEIGHT % P-250*

| Sample # | Surfactant Paranox 106 Grams | Oil S100N Grams | Clay Bentonite Grams | Polymer Cyanamer P-250 Grams | Water Distilled $H_2O$ Grams | Aqueous Phase Weight % P-250 | Low Shear Thickening Time Minutes | Paste Strength After High Shear LB/100 $Ft^2$ |
|---|---|---|---|---|---|---|---|---|
| 51  | 7.5 | 15.5 | 23   | 0.94 | 92.2  | 1.0 | 26   | 6,400 |
| 56  | 9.9 | 20.6 | 30.5 | 1.24 | 123.2 | 1.0 | 28   | 5,200 |
| 66  | 9.9 | 20.6 | 30.5 | 1.24 | 123.2 | 1.0 | 27   | 6,700 |
| 108 | 9.9 | 20.6 | 30.5 | 1.24 | 123.2 | 1.0 | 36   | 7,800 |
| 121 | 9.9 | 20.6 | 30.5 | 1.24 | 123.2 | 1.0 | 21   | 6,200 |
| 107 | 9.9 | 20.6 | 30.5 | 1.87 | 122.6 | 1.5 | 24   | 7,200 |
| 105 | 9.9 | 20.6 | 30.5 | 2.49 | 122.0 | 2.0 | 19   | 7,500 |
| 308 | 9.9 | 20.6 | 30.5 | 3.13 | 121.9 | 2.5 | 10.5 | 7,600 |
| 309 | 9.9 | 20.6 | 30.5 | 3.73 | 120.7 | 3.0 | 7.5  | 8,600 |

*Fixed $H_2O$/clay (4.0), surfactant/clay (.325) and oil/clay (.675) weight ratios

TABLE 5
LOW SHEAR THICKENING TIMES AND PASTE STRENGTHS OF API BENTONITE WELL CONTROL FLUID AFTER APPLICATION OF HIGH SHEAR AS A FUNCTION OF OIL PHASE WEIGHT % PARANOX 106

| Sample # | Surfactant Paranox 106 Grams | Oil S100N Grams | Clay API Bentonite Grams | Polymer Cyanamer P-250 Grams | Water Distilled $H_2O$ Grams | Oil Phase Weight % ECA-5025 | Low Shear Thickening Time Minutes | Paste Strength After High Shear LB/100 $FT^2$ |
|---|---|---|---|---|---|---|---|---|
| 123 | 3.05  | 27.5 | 30.5 | 1.24 | 123 | 10.0 | 4  | 8,200 |
| 100 | 4.97  | 25.5 | 30.5 | 1.24 | 123 | 16.3 | 4  | 7,100 |
| 101 | 7.45  | 23.1 | 30.5 | 1.24 | 123 | 24.4 | 15 | 6,500 |
| 102 | 8.70  | 21.8 | 30.5 | 1.24 | 123 | 28.5 | 28 | 6,200 |
| 121 | 9.94  | 20.6 | 30.5 | 1.24 | 123 | 32.6 | 21 | 6,200 |
| 136 | 9.94  | 20.6 | 30.5 | 1.24 | 123 | 32.6 | 24 | 7,500 |
| 162 | 9.94  | 20.6 | 30.5 | 1.24 | 123 | 32.6 | 25 | 6,000 |
| 163 | 9.94  | 20.6 | 30.5 | 1.24 | 123 | 32.6 | 33 | 5,700 |
| 99  | 12.21 | 18.3 | 30.5 | 1.24 | 123 | 40.0 | 11 | 4,100 |
| 98  | 15.26 | 15.3 | 30.5 | 1.24 | 123 | 50.0 | 7  | 7,100 |
| 125 | 18.31 | 12.2 | 30.5 | 1.24 | 123 | 60.0 | —  | 6,700 |

*Fixed $H_2O$/clay (4.0), (Oil + Surf)/clay (1.0) and polymer/clay (.041) weight ratios

EXAMPLE 2
Field Test Results

In order to test the stability of two different formulations under full scale conditions, 200 gallon slugs of each formulation were prepared and pumped through a horizontal test loop (9140 feet of 2⅞" pipe) at 45° C. The first recipe was pumped one time through the loop at 105 gpm and had a shear strength of 3300 lbs/100 $ft^2$ after shear, but before subsequent kneading as would occur if movement through the pipe occurred after shearing.

| First Recipe | |
|---|---|
| 145 lbs Paranox 106 <br> 110 gallon S100N <br> 600 lbs API bentonite <br> 378 g NaOH in 1 gallon water | Oil Phase |
| 248 gallons 1% p-250 <br> 816 cc 12N HCl | Aqueous Phase |

The second recipe made two passes through the loop with properties as follows:

| | Effluent Shear Strength | |
|---|---|---|
| | As Collected (no shear) | After 1500 psi Nozzle Shear |
| After One Pass | 35 lbs/100 $ft^2$ | 1800 lbs/100 $ft^2$ |
| After Two Passes | 250 lbs/100 $ft^2$ | 3900 lbs/100 $ft^2$ |

| Second Recipe | |
|---|---|
| 340 lbs Paranox 106 <br> 560 lbs S100N <br> 600 lbs API bentonite | Oil Phase |
| 2000 lbs of a 1% solution of P-250 in water | Aqueous Phase |

In both cases, the oil and aqueous phases were pumped into the test pipe simultaneously and mixed inside the test pipe.

EXAMPLE 3
The Effect of Clay Particle Size on Strength and Stability

All systems were prepared by mixing the oil and surfactant and then adding the clay. This mixture was then added to the aqueous polymer and the mixture was stirred. The systems were initially water-continuous (o/w), except for the system designated as w/o/w, in which an oil continuous granular system was first prepared with half of the aqueous polymer, this was then redispersed into the remaining aqueous polymer to form a double emulsion.

All systems contained 100 g of aqueous polyacrylamide solution (P-250). The oil was S100N and the surfactant was ECA 5025. The laboratory apparatus was sealed against evaporation during stirring. All shear strengths were measured at 25° C. after hand kneading.

7. The composite of claim 6 wherein the polyacrylamide is hydrolyzed to a degree ranging from 0–50%.

8. The composite of claim 1, 2, 3, 4, 5, 6 or 7 comprising 100 parts by weight (pbw) clay, 240 to 700 pbw water, 0.1 to 12 pbw water soluble polymer, 30 to 140 pbw oil, and 8 to 70 pbw surfactant.

9. The composite of claim 8 wherein the surfactant is the product obtained by the reaction of the polyamine

TABLE 6

|  | Bentonite Particle Size | | # g Bent. | # g Oil + Surf. | Conc. Surf. (%) | Stability @500RPM(90° C.) (minutes) | Shear Strength (lbs/100ft$^2$) | Polymer Conc. (%) | Apparent Initial Continuity |
|---|---|---|---|---|---|---|---|---|---|
|  | Tyler Mesh | Diam. (microns) |  |  |  |  |  |  |  |
| Magogel | >200 | <75 | 30 | 20 | 22 | 9 | 15,000 | 1.5 | o/w |
| Grnd. KWK | >80 | <180 | 30 | 20 | 22 | 10 | 15,000 | 1.5 | o/w |
| Grnd. KWK | 80–60 | 180–250 | 30 | 20 | 22 | 13 | 15,000 | 1.5 | o/w |
| Grnd. KWK | 60–40 | 250–420 | 40 | 20 | 22 | 15 | 18,000 | 1.5 | o/w |
| Std. KWK | 40–20 | 420–840 | 60 | 30 | 22 | 15 | 18,000 | 1.0 | w/o |
| Std. KWK | 40–20 | 420–840 | 30 | 20 | 22 | 12 | 15,000 | 1.5 | o/w |
| Std. KWK | 40–20 | 420–840 | 30 | 20 | 22 | 21 | 15,000 | 1.0 | w/o/w |
| Heavy End KWK | 20–10 | 840–2000 | 61 | 29 | 12 | 15 | 22,000 | 1.0 | w/o |

What is claimed is:

1. A shear thickening composite comprising:
   (a) a water swellable clay capable of rapidly forming a high strength gel when mixed with water, said clay being present in said composite in sufficient quantity so as to form a gel having a strength of at least 2000 lb/100 ft$^2$;
   (b) a first phase comprising water and water soluble polymer; and
   (c) a second phase comprising oil and surfactant, the water in said first phase being kept separate from said clay by the intervening second phase, said intervening second phase remaining intact during low shear pumping of the composite, said intervening second phase rupturing during the application of high shear to the composite to enable mixing of the water in the first phase and the clay to form the high strength gel.

2. The composite of claim 1 wherein the water swellable clay is selected from the group consisting of montmorillonite clay and attapulgite clay.

3. The composite of claim 1 wherein the oil comprises mineral oil, $C_6$ to $C_{1000}$ paraffinic oil, motor oil, substituted paraffinic oil wherein the substituents are selected from the group consisting of halogens, amines, sulfates, nitrates, carboxylates and hydroxyls.

4. The composite of claim 2 wherein the oil is a $C_6$ to $C_{200}$ liquid paraffin oil.

5. The composite of claim 1 wherein the water soluble polymer is polyacrylamide, polymethacrylamide, polystyrene sulfonate, polyvinyl toluene sulfonate, polyethyleneoxide, or polyvinyl alcohol.

6. The composite of claim 4 wherein the water soluble polymer is polyacrylamide.

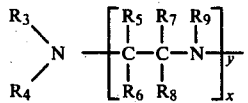

wherein $R_3$, $R_4$, $R_5$, $R_6$, $R_7$, $R_8$, $R_9$ and y are selected from the group consisting of hydrogen, $C_1$ to $C_{20}$ alkyl, $C_6$ to $C_{20}$ aryl, $C_7$ to $C_{20}$ alkaryl radicals and substituted derivatives thereof and x is an integer of from 1 to 100 with polyalkenyl succinic anhydrides, reaction proceeding at the $R_3$, $R_4$ substituted nitrogen.

10. The composite of claim 9 wherein the polyalkenyl succinic anhydride is selected from the group consisting of polyisobutylene succinic anhydride, polypropenyl succinic anhydride and polybutenyl succinic anhydride.

11. The composite of claim 9 wherein the surfactant is represented by the general formula:

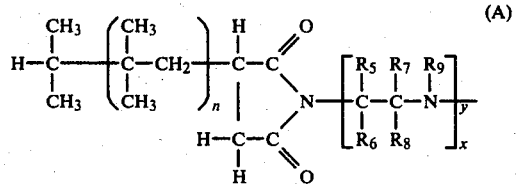

wherein n varies from 10 to 60, preferably 10 to 30, most preferably 15–17; x varies from 1 to 100, preferably 3 to 10; $R_5$, $R_6$, $R_7$, $R_8$, $R_9$ are hydrogen $C_1$ to $C_{20}$ alkyl, $C_6$ to $C_{20}$ aryl, $C_7$ to $C_{20}$ alkaryl radical and substituted derivative thereof, and y is selected from the group consisting of hydrogen and oxygen containing hydrocarbyl radicals having up to 10 carbons.

12. The composite of claim 11 wherein the surfactant is represented by the formula:

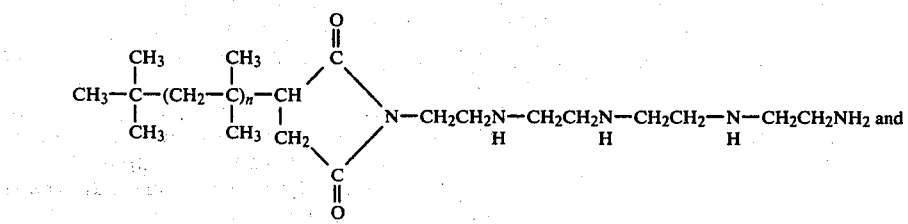

-continued

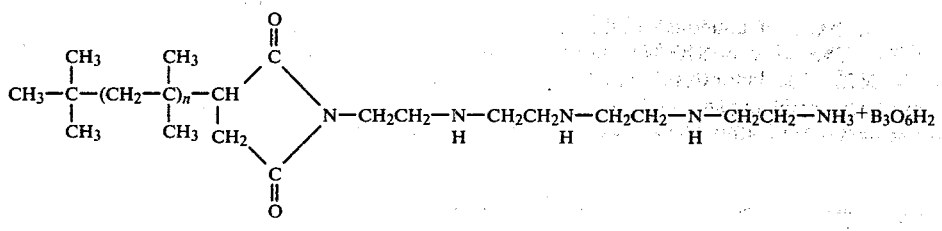

13. The composite of claim 8 wherein the clay is suspended in the oil-surfactant phase and this encapsulated clay slurry is suspended in the water-polymer phase, the water-polymer phase being a continuous phase.

14. The composite of claim 8 wherein the clay is suspended in the oil-surfactant phase as discrete particles and the water-polymer phase is also suspended in the oil-surfactant as discrete particles, the oil-surfactant phase being a continuous phase.

15. The composite of claim 11 wherein the clay is suspended in the oil-surfactant phase and this encapsulated clay slurry is suspended in the water-polymer phase, the water-polymer phase being a continuous phase.

16. The composite of claim 11 wherein the clay is suspended in the oil-surfactant phase as discrete particles and the water-polymer phase is also suspended in the oil-surfactant as discrete particles, the oil-surfactant phase being a continuous phase.

17. The composite of claim 8 wherein the clay is API Bentonite clay or API attapulgite clay.

18. The composite of claim 11 wherein the clay is API Bentonite clay or API attapulgite clay.

19. The composite of claim 13 wherein the clay is API Bentonite clay or API attapulgite clay.

20. A method for treating a well penetrating a subterranean formation to block off unwanted flow paths comprising introducing into said well a shear thickening composite stable to pumping comprising a water swellable material capable of rapidly forming a still paste when mixed with a water-water soluble/water swellable polymer solution, an oil-surfactant phase and a water-water soluble/water swellable polymer phase wherein the water swellable material, present in sufficient quantity so as to form a paste having a strength of at least 2000 lb/100 ft$^2$, and the water-polymer solution are kept separated, by the intervening oil-surfactant phase, and subjecting said shear thickening composite to high shear mixing thereby rupturing the intervening oil-surfactant phase, mixing the water swellable material and the water-polymer causing it to thicken into a high strength semi-rigid paste which blocks off unwanted flow paths.

21. The method of claim 20 wherein the high shear mixing consists of passing the shear thickening fluid through the orifices of a drill bit or nozzle in the well, thereby rupturing the intervening oil-surfactant phase.

22. The method of claim 20 wherein the shear thickening composite comprises 100 parts by weight (pbw) clay, 240 to 700 pbw water, 0.1 to 12 pbw water soluble polymer, 30 to 140 pbw oil and 8 to 70 pbw surfactant.

23. The method of claim 22 wherein the clay is montmorillonite clay or attapulgite clay, the oil is mineral oil, $C_6$ to $C_{1000}$ paraffinic oil, motor oil and substituted paraffinic oil wherein the substituents are selected from the group consisting of halogens, amines, sulfates, nitrates, carboxylates and hydroxyls and the surfactant is the product obtained by the reaction of the polyamine $$R_3 \diagdown N \diagup R_4 \quad \left[ \begin{array}{ccc} R_5 & R_7 & R_9 \\ | & | & | \\ C-C-N \\ | & | \\ R_6 & R_8 \end{array} \right]_y \Bigg]_x$$

wherein $R_3$–$R_9$ and y are chosen from the group consisting of hydrogen, $C_1$ to $C_{20}$ alkyl, $C_6$ to $C_{20}$ aryl, $C_7$ to $C_{20}$ alkaryl radicals and substituted derivatives thereof and x is an integer of from 1 to 100 with polyalkenyl succinic anhydrides, reaction proceding at the $R_3$, $R_4$ substituted nitrogen, and the water swellable/water soluble polymer is polyacrylamide, polymethacrylamide, polystyrene sulfonate, polyvinyl toluene sulfonate, polyethylene oxide and polyvinyl alcohol.

24. The method of claim 23 wherein the water swellable/water soluble polymer is polyacrylamide.

25. The method of claim 22, 23 or 24 wherein the clay is API Bentonite clay or API attapulgite clay and the clay is suspended in the oil-surfactant phase and this encapsulated clay slurry is suspended in the water-polymer phase, the water-polymer phase being a continuous phase.

26. The method of claim 22, 23, or 24 wherein the surfactant is represented by the general formula:

$$\text{(A)}$$

wherein n varies from 10 to 60, preferably 10 to 30, most preferably 15–17; x varies from 1 to 100, preferably 3 to 10; $R_5$, $R_6$, $R_7$, $R_8$, $R_9$ are hydrogen $C_1$ to $C_{20}$ alkyl, $C_6$ to $C_{20}$ aryl, $C_7$ to $C_{20}$ alkaryl radical and substituted derivatives thereof, and y is selected from the group consisting of hydrogen and oxygen containing hydrocarbyl radicals having up to 10 carbons.

27. The method of claim 25 wherein the surfactant is of the formula:

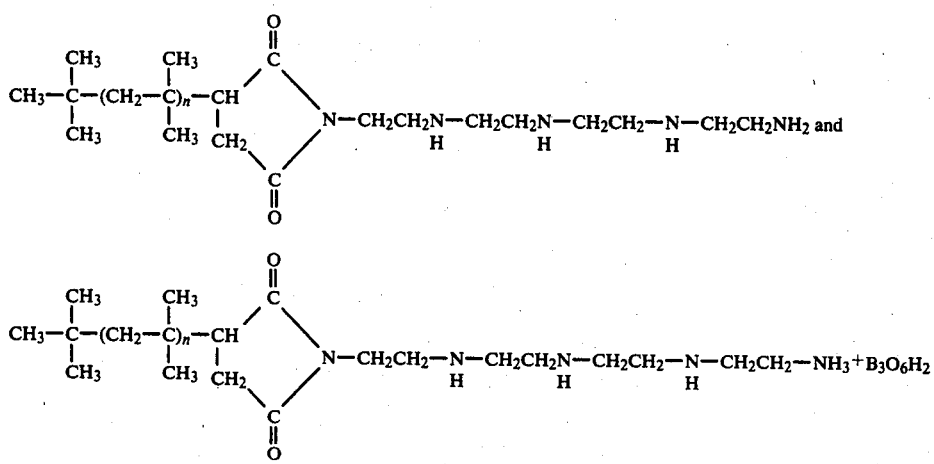

28. A shear thickening composite comprising:
(a) 100 parts by weight (pbw) of a water swellable clay capable of rapidly forming a high strength gel when mixed with water;
(b) a first phase comprising about 240 to about 700 pbw of water and about 0.1 to about 12 pbw of water soluble polymer; and
(c) a second phase comprising about 30 to about 140 pbw oil and about 8 to about 70 pbw surfactant, the water in said first phase being kept separate from said clay by the intervening second phase, said intervening second phase remaining intact during low shear pumping of the composite, said intervening second phase rupturing during the application of high shear to the composite to enable mixing of the water in the first phase and the clay to form the high strength gel.

* * * * *